United States Patent
Czaplik et al.

(10) Patent No.: US 10,479,893 B2
(45) Date of Patent: Nov. 19, 2019

(54) PREPARATION OF IRON (III) OXIDE PIGMENT

(71) Applicant: LANXESS DEUTSCHLAND GMBH, Cologne (DE)

(72) Inventors: Waldemar Czaplik, Krefeld (DE); Guido Ketteler, Dusseldorf (DE); Jurgen Kischkewitz, Ratingen (DE)

(73) Assignee: LANXESS Deutschland GmbH, Cologne (DE)

( * ) Notice: Subject to any disclaimer, the term of this patent is extended or adjusted under 35 U.S.C. 154(b) by 260 days.

(21) Appl. No.: 15/507,808

(22) PCT Filed: Sep. 4, 2015

(86) PCT No.: PCT/EP2015/070198
§ 371 (c)(1),
(2) Date: Mar. 1, 2017

(87) PCT Pub. No.: WO2016/034692
PCT Pub. Date: Mar. 10, 2016

(65) Prior Publication Data
US 2017/0292024 A1    Oct. 12, 2017

(30) Foreign Application Priority Data
Sep. 5, 2014 (EP) .................. 14183796

(51) Int. Cl.
*C09C 1/24* (2006.01)
*C01G 49/06* (2006.01)

(52) U.S. Cl.
CPC .............. *C09C 1/24* (2013.01); *C01G 49/06* (2013.01); *C01P 2004/64* (2013.01); *C01P 2006/12* (2013.01)

(58) Field of Classification Search
CPC ....... C01C 1/24; C01G 49/06; C09P 2004/64; C01P 2006/12
See application file for complete search history.

(56) References Cited

U.S. PATENT DOCUMENTS

| | | | |
|---|---|---|---|
| 1,327,061 A | 1/1920 | Penniman et al. | |
| 1,368,748 A | 2/1921 | Penniman et al. | |
| 2,937,927 A | 5/1960 | Ayers | |
| 3,946,103 A * | 3/1976 | Hund | C09C 1/24 423/633 |
| 4,753,680 A | 6/1988 | Burow et al. | |

(Continued)

FOREIGN PATENT DOCUMENTS

| CN | 1054088 A | 8/1991 |
|---|---|---|
| CN | 19981012321 A | 7/1999 |

(Continued)

OTHER PUBLICATIONS

Shen, Qing, et al., "Preparation of crystal seeds of iron oxide red by nitric acid method and its effect on oxidation", Wujiyan Gongye (1997), (6), 5-6, Wujiyan Gonge Bianjib, four pages.

(Continued)

*Primary Examiner* — Pegah Parvini

(57) ABSTRACT

The present invention relates to an improved process for producing iron oxide red pigments by the Penniman process using nitrate (also referred to as nitrate process or direct red process).

14 Claims, 1 Drawing Sheet

(56) References Cited

U.S. PATENT DOCUMENTS

| | | | |
|---|---|---|---|
| 5,421,878 A | 6/1995 | Lerch et al. | |
| 5,837,216 A * | 11/1998 | Burow | C01G 49/06 423/632 |
| 6,056,928 A | 5/2000 | Fetzer et al. | |
| 6,179,908 B1 | 1/2001 | Braun et al. | |
| 6,503,315 B1 | 1/2003 | Etzenbach et al. | |
| 6,616,747 B2 * | 9/2003 | Sumita | B82Y 30/00 106/456 |
| 7,144,455 B2 | 12/2006 | Meisen et al. | |
| 7,294,191 B2 | 11/2007 | Rosenhahn et al. | |
| 8,206,681 B2 | 6/2012 | Garetto | |
| 8,574,450 B2 | 11/2013 | Conca et al. | |
| 2003/0170163 A1 | 9/2003 | Banerjee et al. | |
| 2014/0205664 A1 * | 7/2014 | Ketteler | C01G 49/06 424/464 |
| 2016/0272836 A1 | 9/2016 | Czaplik et al. | |
| 2017/0253745 A1 | 9/2017 | Czaplik et al. | |
| 2017/0267544 A1 | 9/2017 | Czaplik et al. | |
| 2017/0292024 A1 | 10/2017 | Czaplik et al. | |

FOREIGN PATENT DOCUMENTS

| | | | |
|---|---|---|---|
| CN | 1699477 A | 11/2005 | |
| EP | 0059248 A1 | 9/1982 | |
| EP | 0645437 B1 | 3/1997 | |
| JP | 62230624 A2 | 10/1987 | |
| JP | 6320367 A2 | 1/1988 | |
| JP | 7309627 A2 | 11/1995 | |
| JP | 2013193939 A2 | 9/2013 | |
| JP | 20140144447 A2 | 10/2014 | |
| KR | 20090104327 A | 10/2009 | |
| RU | 2047556 C1 | 11/1995 | |
| SU | 1458368 A1 | 2/1989 | |
| WO | WO 2013/045608 | * 4/2013 | C01G 49/06 |

OTHER PUBLICATIONS

Ullmann's Encyclopedia of Industrial Chemistry, Inorganic Pigments, Chapter 3.1.1, Iron Oxide Pigments, pp. 61-67.

European Search Report from European Application No. 14183796, dated Feb. 11, 2015, two pages.

Japanese Search Report from corresponding Japanese Application No. 2017-512913, date unknown, one page.

Japanese List of Citations corresponding to Japanese Application No. 2017-512913, Mailing No. 099571, dated Mar. 12, 2018, one pages.

Russian Search Report from corresponding Russian Application No. 2017444247/08, dated Mar. 18, 2019 two pages.

* cited by examiner

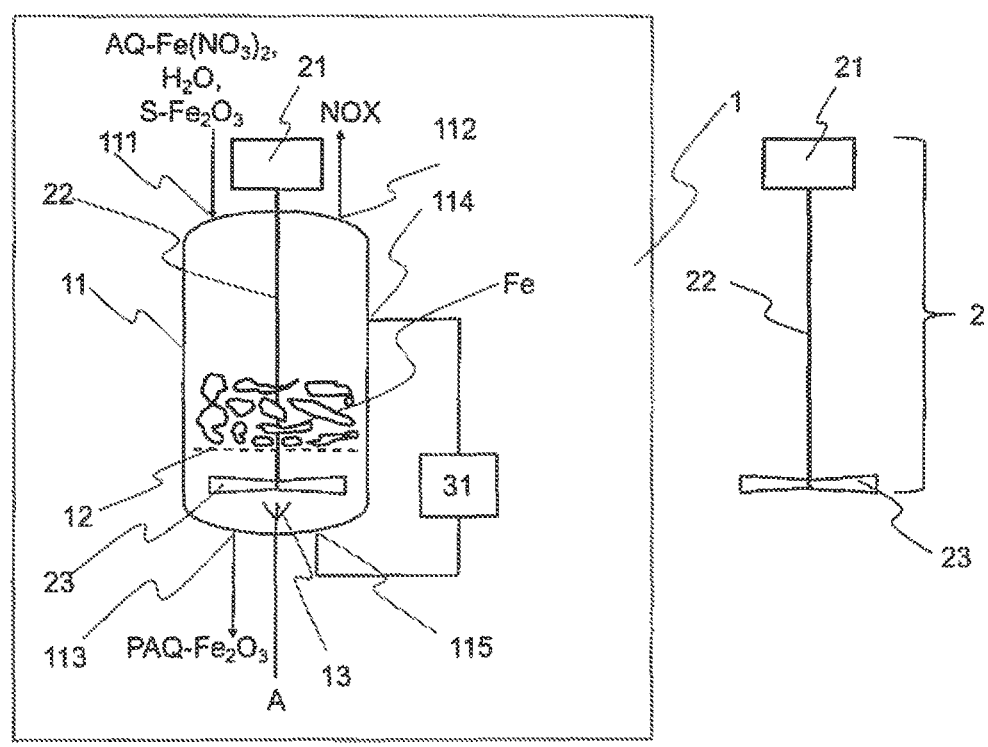

PREPARATION OF IRON (III) OXIDE PIGMENT

The present invention relates to an improved process for producing iron oxide red pigments by the Penniman process using nitrate (also referred to as nitrate process or direct red process).

Iron oxides are employed in many industrial fields. Thus, for example, they are used as colour pigments in ceramics, building materials, plastics, paints, surface coatings and paper, serve as basis for various catalysts or support materials and can adsorb or absorb pollutants. Magnetic iron oxides are employed in magnetic recording media, toners, ferrofluids or in medical applications, for example as contrast agent for magnetic resonance tomography.

Iron oxides can be obtained by aqueous precipitation and hydrolysis reactions of iron salts (Ullmann's Encyclopedia of Industrial Chemical, VCH Weinheim 2006, Chapter 3.1.1. Iron Oxide Pigments, pp. 61-67). Iron oxide pigments obtained by the precipitation process are produced from iron salt solutions and alkaline compounds in the presence of air. Targeted control of the reaction enables finely divided goethite, magnetite and maghemite particles to be prepared in this way. However, the red pigments produced by this process have a comparatively low colour saturation and are therefore used primarily in the building materials industry.

The aqueous production of finely divided haematite, which corresponds to the modification $\alpha$-$Fe_2O_3$, is, however, considerably more complicated. Use of a ripening step and addition of a finely divided iron oxide of the maghemite modification, $\gamma$-$Fe_2O_3$, or lepidocrocite modification, $\gamma$-FeOOH, as nucleus enables hematite also to be produced by direct aqueous precipitation [U.S. Pat. No. 5,421,878; EP0645437; WO 2009/100767].

A further method of producing iron oxide red pigments is the Penniman process (U.S. Pat. Nos. 1,327,061; 1,368,748; 2,937,927; EP 1106577A; U.S. Pat. No. 6,503,315). Here, iron oxide pigments are produced by iron metal being dissolved and oxidized with addition of an iron salt and an iron oxide nucleus. Thus, SHEN, Qing; SUN, Fengzhi; Wujiyan Gongye 1997, (6), 5-6 (CH), Wujiyan Gongye Bianjib, (CA 128:218378n) have disclosed a process in which dilute nitric acid acts on iron at elevated temperature. This forms a haematite nucleus suspension. This is built up in a manner known per se to give a suspension of red pigment and the pigment is, if desired, isolated from the suspension in a conventional manner. However, the red pigments produced by this process have a comparatively low colour saturation which is similar to the colour saturation of a commercial 130 standard and are therefore primarily used in the building industry. The 130 standard corresponds to the reference standard Bayferrox® 130 customarily used for iron oxide pigment colour measurements.

EP 1106577A discloses a variant of the Penniman process which comprises dilute nitric acid acting on iron at elevated temperature to produce nuclei, i.e. finely divided iron oxides having a particle size of less than or equal to 100 nm. The reaction of iron with nitric acid is a complex reaction and can lead to either passivation of the iron and thus cessation of the reaction or to dissolution of the iron to form dissolved iron nitrate depending on the experimental conditions. Both reaction paths are undesirable and the production of finely divided haematite is successful only under limited experimental conditions. EP 1106577A describes such conditions for producing finely divided haematite. Here, the iron is reacted with dilute nitric acid at temperatures in the range from 90 to 99° C. WO 2013/045608 describes a process for producing iron oxide red pigments, in which the reaction step of production of the nuclei, i.e. of finely divided haematite having a particle size of less or equal to 100 nm, has been improved.

The Penniman process has, according to the prior art, hitherto been carried out on an industrial scale using simple agents. For example, the buildup of the pigment, i.e. the reaction of a haematite nucleus suspension with iron and introduction of air is carried out without mechanical or hydraulic mixing. Only the introduction of air leads to strong mixing of the reaction mixture here. On the industrial scale (batch size of more than 10 m$^3$), the Penniman process using nitric acid is, according to the prior art typically carried out at air introduction volumes of from 7 to 10 m$^3$ per hour and m$^3$ of suspension, resulting in strong convection in the reaction mixture and strong bubble formation, comparable to vigorous boiling of a liquid, at the surface of the reaction mixture being generated. The haematite pigments produced by the Penniman process usually have a full shade a* value of >25 CIELAB units in the surface coating test customary for iron oxide pigments in a long oil alkyd resin having a thixotropic effect (using a method based on DIN EN ISO 11664-4:2011-07 and DIN EN ISO 787-25:2007).

However, these processes which are efficient per se and allow direct production of high-quality red iron oxides with a great variation of the colour values have the following disadvantages:

1. Emission of nitrogen oxides. Nitrogen oxides can be toxic (e.g. the nitrous gases NO, $NO_2$ and $N_2O_4$, generally also referred to as "$NO_x$"), produce smog, destroy the ozone layer of the atmosphere on irradiation with UV light and are greenhouse gases. Dinitrogen monoxide, in particular, is a stronger greenhouse gas than carbon dioxide by a factor of about 300. In addition, dinitrogen monoxide is now considered to be the strongest ozone killer. In the Penniman process using nitric acid, both the nitrous gases NO and $NO_2$ and also dinitrogen monoxide are formed in appreciable amounts.
2. The Penniman process using nitric acid produces nitrogen-containing wastewater which contains significant amounts of nitrates, nitrites and ammonium compounds.
3. The Penniman process using nitric acid is very energy-intensive because large volumes of aqueous solutions have to be heated by introduction of external energy to temperatures of from 60° C. to 120° C. In addition, energy is removed from the reaction mixture by the introduction of oxygen-containing gases as oxidants into the reaction mixture (steam stripping), and this has to be introduced again as heat.

For the purposes of the present invention, nitrogen oxides are nitrogen-oxygen compounds. This group includes the nitrous gases of the general formula $NO_x$ in which the nitrogen can have different oxidation numbers in the range from +1 to +5. Examples are NO (nitrogen monoxide, oxidation number +2), $NO_2$ (nitrogen dioxide, oxidation number +4), $N_2O_5$ (oxidation number +5). $NO_2$ is present in a temperature- and pressure-dependent equilibrium with its dimer $N_2O_4$ (both oxidation number +IV). In the following, the term $NO_2$ encompasses both $NO_2$ itself and its dimer $N_2O_4$. $N_2O$ (dinitrogen monoxide, laughing gas, oxidation number +1) also belongs to the group of nitrogen oxides but is not counted among the nitrous gases.

It was therefore an object of the invention to provide an efficient and environmentally friendly process for producing iron oxide red pigments which avoids the abovementioned disadvantages and in which, firstly, iron oxide red pigments having a broad colour spectrum are produced in high yield and, secondly, the proportion of nitrogen oxides given off into the environment and energy given off into the environment is minimized, so that less energy is required for producing the iron oxide red pigments.

The invention accordingly provides a process for producing iron oxide red pigments which achieves this object and also an apparatus in which this process can be carried out, including on an industrial scale, comprising at least the reaction of at least iron with an aqueous haematite nucleus suspension containing haematite nuclei which have a particle size of 100 nm or less and a specific BET surface area of from 40 m$^2$/g to 150 mg$^2$/g (measured in accordance with DIN 66131) and an iron(II) nitrate solution in the presence of at least one oxygen-containing gas at temperatures of from 70 to 99° C., producing a haematite pigment suspension.

In one embodiment, the reaction is carried out until the haematite pigment has the desired colour shade. The desired colour shade is in the case of iron oxide red pigments usually carried out in a surface coating test using a long oil alkyd resin having a thixotropic effect (using a method based on DIN EN ISO 11664-4:2011-07 and DIN EN ISO 787-25: 2007). To test the colour values of inorganic colour pigments, the pigment is dispersed in a binder paste based on a nondrying long oil alkyd resin (L64). The pigmented paste is painted into a paste plate and subsequently evaluated colorimetrically in comparison with the reference pigment. Here, the colour coordinates and colour spacings in an approximately uniform CIELAB colour space are determined in full shade and reduction. The a* and b* values in the surface coating test are the most suitable parameters for the colour shade of the pigment.

In a further embodiment, the process of the invention comprises separation of the haematite pigment from the haematite pigment suspension by conventional methods.

The reaction of iron, haematite nucleus suspension and iron(II) nitrate solution in the presence of at least one oxygen-containing gas at temperatures of from 70 to 99° C. is also referred to as pigment buildup.

In a further embodiment, the process of the invention comprises the reaction of iron, haematite nucleus suspension containing haematite nuclei having a particle size of 100 nm or less and a specific BET surface area of from 40 m$^2$/g to 150 m$^2$/g (measured in accordance with DIN 66131) and iron(II) nitrate solution in the presence of at least one oxygen-containing gas at temperatures of from 70 to 99° C., characterized in that the reaction is carried out with mixing of the liquid phase by means of mechanical and/or hydraulic mixing and the introduction of at least one oxygen-containing gas is carried out using a gas introduction volume of 6 m$^3$ of gas volume/m$^3$ of batch volume/hour or less, preferably from 0.2 to 6 m$^3$ of gas volume/m$^3$ of batch volume/hour, particularly preferably from 0.2 to 5 m$^3$ of gas volume/m$^3$ of batch volume/hour, very particularly preferably from 0.2 to 3 m$^3$ of gas volume/m$^3$ of batch volume/hour.

The iron oxide red pigments produced by the process of the invention have the haematite modification (α-Fe$_2$O$_3$) and are therefore also referred to as haematite pigments in the context of the present invention.

In one embodiment, the pigment buildup according to the process of the invention is carried out in a reactor as shown in FIG. 1.

The invention further comprises apparatuses suitable for carrying out the process of the invention. These are described in more detail below with the aid of FIG. 1.

FIG. 1 depicts an apparatus according to the invention.

In FIG. 1, the symbols have the following meanings:

A Oxygen-containing gas
Fe Iron
AQ-Fe(NO$_3$)$_2$ Iron(II) nitrate solution
S—Fe$_2$O$_3$ Haematite nucleus suspension
PAQ-Fe$_2$O$_3$ Haematite pigment suspension
H$_2$O Water
NOX Nitrogen oxide-containing stream (offgas from the production of the haematite pigment suspension)
1 Reactor for producing haematite pigment suspension
11 Reaction vessel
12 Support for iron
13 Gas introduction unit
111 Inlet for iron(II) nitrate solution, haematite nucleus suspension
112 Outlet for NOX
113 Outlet for haematite pigment suspension
114 Outlet for liquid phase
115 Inlet for liquid phase
2 Stirring device
21 Drive
22 Connection between drive and stirrer
23 Stirrer
31 Pump Reactor 1 typically comprises one or more reaction vessels made of materials which are resistant to the starting materials. Single reaction vessels can be, for example, brick-lined or tiled vessels let into the earth. The reactors also comprise, for example, vessels made of glass, nitric acid-resistant plastics such as polytetrafluoroethylene (PTFE), steel, e.g. enamelled steel, plastic-coated or painted steel, stainless steel having the material number 1.44.01. The reaction vessels can be opened or closed. In preferred embodiments of the invention, the reaction vessels are closed. The reaction vessels are typically designed for temperatures in the range from 0 to 150° C. and for pressures of from 0.05 MPa (0.05 megapascal correspond to 0.5 bar) to 1.5 MPa (1.5 megapascal correspond to 15 bar).

A preferred embodiment of a reactor 1 is shown in FIG. 1. Reactor 1 has at least reaction vessel 11, support 12 for iron, gas introduction unit 13 for the at least one oxygen-containing gas A, inlet 111 for at least iron(II) nitrate solution and haematite nucleus suspension, outlet 112 for a nitrogen oxide-containing stream NOX, outlet 113 for the haematite pigment suspension, outlet for liquid phase 114, inlet for liquid phase 115, a stirring device 2 comprising a drive 21, a connection between drive and stirrer 22, a stirrer 23 and a pump 31. Outlet 114, inlet 115 and pump 31 are connected to one another via a conduit in such a way that the liquid phase can be circulated from the reaction vessel 11 through the conduit and back into the reaction vessel 11.

A further preferred embodiment of a reactor 1 has at least reaction vessel 11, support 12 for iron, gas introduction unit 13 for the at least one oxygen-containing gas A, inlet 111 for at least iron(II) nitrate solution and haematite nucleus suspension, outlet 112 for a nitrogen oxide-containing stream NOX, outlet 113 for the haematite pigment suspension, a stirring device 2 comprising a drive 21, a connection between drive and stirrer 22 and a stirrer 23.

A further preferred embodiment of a reactor 1 has at least reaction vessel 11, support 12 for iron, gas introduction unit 13 for the at least one oxygen-containing gas A, inlet 111 for at least iron(II) nitrate solution and haematite nucleus suspension, outlet 112 for a nitrogen oxide-containing stream NOX, outlet 113 for the haematite pigment suspension, outlet for liquid phase 114, inlet for liquid phase 115 and a pump 31.

The process of the invention is described in more detail below. For the purposes of the present invention, mechanical and/or hydraulic mixing is the mixing of the liquid phase by means of suitable devices. According to the invention, the liquid phase also contains solids suspended therein, for example the haematite nuclei or the haematite pigment or else further solids such as iron particles. Suitable devices for the mechanical mixing encompass stirring devices, for example axial stirrers, radial stirrers and tangential stirrers. Stirring devices such as the stirring device 2 in FIG. 1 have at least one stirrer such as the stirrer 23 in FIG. 1, for example propellers, helices or blades which generate flow of the liquid phase. Stirring devices also typically have a drive such as the drive 21 in FIG. 1, e.g. a motor, and a connection between stirrer and drive 22, e.g. a shaft or magnetic coupling. Depending on the stirrer type, flows are generated in the radial direction, i.e. at right angles to the stirrer axis, or in the axial direction, i.e. parallel to the stirrer axis, or mixtures thereof. For example, blade stirrers preferably produce radial flows, inclined blade stirrers and propeller stirrers produce axial flows. Axial flows can be directed upwards or downwards. For the purposes of the present invention, mechanical mixing of the liquid phase which is directed axially from below upwards onto the iron is preferred. This ensures that the liquid phase present in the voids between the iron pieces is also mixed with the liquid phase present outside the voids between the iron pieces. The at least one stirrer is preferably located below and/or above the iron. Axial stirrers, particularly preferably inclined blade stirrers or propeller stirrers, are likewise preferred as stirrers.

In one embodiment, baffles are additionally present on the interior wall of the reaction vessel 1 in the case of radially acting stirrers. Corotation of the liquid phase and the resulting formation of vortices is thus avoided.

The degree of mechanical mixing is defined by the outer circumferential velocity of the stirrer, for example the stirrer 23. Preferred circumferential velocities are 0.5-15 m/s, measured at the circumference of the circle formed by the diameter of the stirrer. The power input into the liquid phase, which can be derived from the power uptake of the stirrer, is, according to the invention, from 0.1 to 5 kW per $m^3$ of batch volume, preferably from 0.4 to 3 kW per $m^3$ of batch volume. The ratio of stirrer diameter to the internal diameter of the reactor is preferably from 0.1 to 0.9. The power input into the liquid phase is given by the power uptake of the stirrer multiplied by the efficiency of the stirrer in percent. Typical efficiencies of stirrers used in the process of the invention are in the range from 70 to 90%.

For the purposes of the invention, circumferential velocities of from 1 to 15 m/s and a power input of at least 0.4 kW/$m^3$ of batch volume are particularly preferred.

Hydraulic mixing is carried out by means of a pump, for example pump 31, which takes the liquid phase from the reactor at an outlet, for example outlet 114, and feeds it back into the reactor at another place by an inlet, for example inlet 115. Flows are produced at the inlet and outlet and also in the entire reaction mixture. For the purposes of the invention, pumped circulation volumes of from 0.1 to 20 batch volumes/hour are preferred. For example, the amounts circulated by pumping at a batch volume of 30 $m^3$ and a value of 5 batch volumes/hour is 150 $m^3$/hour. In a further embodiment, amounts circulated by pumping which generate a flow velocity at the inlet, for example inlet 115, of at least 0.05 m/s, preferably from at least 0.06 to 15 m/s, are preferred. Here, the flow velocities are measured at the inlet directly at the transition of the line from which the pumped liquid phase flows into the reaction mixture in the interior of the reactor. In a further embodiment, the flow is directed from the inlet, for example inlet 115, onto the iron support, for example iron support 12, preferably directed from underneath the iron support onto the iron support at a distance of less than 2 m, preferably less than 1 m. In a further embodiment, the inlet, for example inlet 115, is configured as a pipe or as a two-fluid sprayer or as nozzle.

It may be remarked at this point that the scope of the invention encompasses all possible combinations of the general ranges or preferred ranges mentioned above and in the following for components, value ranges or process parameters.

The aqueous haematite nucleus suspensions used in the process of the invention and the haematite nuclei present therein are known from the prior art. On the subject, reference is made to the description of the prior art. The haematite nuclei present in the water-containing haematite nucleus suspensions comprise nuclei having a particle size of 100 nm or less and a specific BET surface area of from 40 $m^2$/g to 150 $m^2$/g (measured in accordance with DIN 66131). The criterion of the particle size is satisfied when at least 90% of the haematite nuclei have a particle size of 100 nm or less, particularly preferably from 30 nm to 90 nm. The aqueous haematite nucleus suspensions used in the process of the invention typically comprise haematite nuclei having a round, oval or hexagonal particle shape. The finely divided haematite typically has a high purity. Foreign metals present in the iron scrap used for producing the haematite nucleus suspension are generally manganese, chromium, aluminium, copper, nickel, cobalt and/or titanium in a variety of concentrations, which can also be precipitated as oxides or oxyhydroxides and incorporated into the finely divided haematite during the reaction with nitric acid. The haematite nuclei present in the water-containing haematite nucleus suspension typically have a manganese content of from 0.1 to 0.7% by weight, preferably from 0.4 to 0.6% by weight. Strongly coloured red iron oxide pigments can be produced using nuclei of this quality.

The iron(II) nitrate solutions used in the process of the invention are known from the prior art. On the subject, reference is made to the description of the prior art. These iron(II) nitrate solutions typically have concentrations of from 50 to 150 g/l of Fe($NO_3$)$_2$ (reported as Fe($NO_3$)$_2$ based on water-free matter). Apart from Fe($NO_3$)$_2$, the iron(II) nitrate solutions can also contain amounts of from 0 to 50 g/l of Fe($NO_3$)$_3$. However, very small amounts of Fe($NO_3$)$_3$ are advantageous.

As iron, use is usually made in the process of the invention of iron in the form of wire, sheet, nails, granules or coarse turnings. The individual pieces can have any shape and usually have a thickness (e.g. measured as diameter of a wire or as thickness of a sheet) of from about 0.1 millimeter to about 10 mm. The size of wire bundles or of sheets used in the process usually depends on practicabilities. Thus, the reactor has to be able to be filled without difficulty with this starting material, which is generally effected through a manhole. Such iron is produced, inter alia, as scrap or as by-product in the metal processing industry, for example stamping sheets.

The iron used in the process of the invention generally has an iron content of >90% by weight. Impurities present in this iron are usually foreign metals such as manganese, chromium, silicon, nickel, copper and other elements. However, iron having a higher purity can also be used without disadvantages. Iron is typically used in an amount of from 20 to 150 g/l based on the volume of the reaction mixture at the beginning of the reaction according to the invention. In a further preferred embodiment, the iron, preferably in the form of stamping sheets or wires, is distributed on the iron support over the area thereof with a preferred bulk density of less than 2000 kg/m$^3$, particularly preferably less than 1000 kg/m$^3$. The bulk density can, for example, be achieved by bending sheets of at least one iron grade and/or by targeted laying of the iron. This leads to typically more than 90% by volume of the oxygen-containing gas blown in under the iron support to pass through the iron support without the oxygen-containing gas building up under the iron support.

The iron support, for example support 12, makes exchange of suspension and gas through the openings present in the iron support possible. Typical embodiments of the iron support can be sieve trays, perforated trays or meshes. In one embodiment, the ratio of the cumulated area of openings to the total support area is from 0.1 to 0.9, preferably from 0.1 to 0.3. The holes or openings required for exchange of suspension are typically selected so that falling of the iron through the iron support is largely prevented. The iron support, for example support 12, can correspond to the diameter of the internal diameter of the reactor, for example the internal diameter of the reaction vessel 11, or be made smaller. In the latter case, a wall is preferably installed at the side of the iron support device so as to prevent iron from falling down. This wall can be permeable to the suspension, for example configured as mesh, or impermeable to the suspension and have, for example, the shape of a tube or a cuboid open at the top.

In the process of the invention, the reaction of at least iron, haematite nucleus suspension and iron(II) nitrate solution in the presence of at least one oxygen-containing gas is carried out at temperatures of from 70 to 99° C.

The at least one oxygen-containing gas is preferably selected from among air, oxygen, air heated to above ambient temperature or air enriched with steam.

According to the process of the invention, the reaction of at least iron, haematite nucleus suspension and iron(II) nitrate solution is carried out with at least the liquid phase present during the reaction being mixed by means of mechanical and/or hydraulic mixing. Since suspended haematite is present in the liquid phase, the mechanical and/or hydraulic mixing is preferably carried out in such a way that the haematite suspended in the liquid phase remains uniformly dispersed in the liquid phase and does not accumulate in the lower part of the liquid phase.

According to the process of the invention, the reaction of at least iron, haematite nucleus suspension and iron(II) nitrate solution is carried out with introduction of at least one oxygen-containing gas at a gas introduction volume of 6 m$^3$ of gas volume/m$^3$ of batch volume/hour or less, preferably from 0.2 to 6 m$^3$ of gas volume/m$^3$ of batch volume/hour, particularly preferably from 0.2 to 5 m$^3$ of gas volume/m$^3$ of batch volume/hour, very particularly preferably from 0.2 to 3 m$^3$ of gas volume/m$^3$ of batch volume/hour. According to the invention, the reaction mixture comprises all starting materials and the solid, liquid and gaseous products formed therefrom. A nitrogen oxide-containing stream NOX is formed during the reaction. In a preferred embodiment, the nitrogen oxide-containing stream NOX is discharged from the reactor, for example via the outlet 112 of reactor 1. The batch volume is, according to the invention, defined as total volume of the liquid and solid constituents of the reaction mixture which is present in the reaction vessel, for example in reactor 1, at a particular point in time during the reaction. The batch volume can, for example, be determined at any point in time during the reaction via a fill level indicator on the reactor in which the reaction is carried out.

The introduction of at least one oxygen-containing gas is preferably carried out by introducing at least one oxygen-containing gas into the liquid phase of the reaction mixture underneath the iron support, for example support 12. The introduction of the gas is preferably carried out using a gas introduction unit, for example gas introduction unit 13, e.g. sparging ring, nozzles, (two)-fluid sprayers or a pipe ring provided with holes, which is located within the reaction mixture. For this purpose, the at least one oxygen-containing gas must have a sufficient pressure to counter the hydrostatic pressure of the liquid column of the reaction mixture.

During the process of the invention, the pigment is built up on the haematite nucleus present in the liquid phase, producing a haematite pigment suspension whose colour values, preferably a* and b* values, in the surface coating test change during the reaction as a result of the changing particle size and/or morphology during the pigment buildup. The point in time at which the process of the invention is stopped is determined by measuring the colour values of the haematite pigment present in the haematite pigment suspension. The process of the invention is stopped when the haematite pigment has the desired colour shade, preferably the desired a* and b* values in full shade or in reduction, in the surface coating test. This is effected by stopping the introduction of gas, optionally by simultaneous cooling of the reaction mixture to a temperature below 70° C. Typical reaction times for the reaction according to the invention are from 10 to 150 hours, depending on the desired colour shade.

In a preferred embodiment, the haematite pigment is separated off from the haematite suspension by customary methods, preferably by filtration and/or sedimentation and/or centrifugation, after the reaction according to the invention. Washing of the filter cake obtained after the separation and subsequent drying of the filter cake are preferably likewise carried out. One or more sieving steps, particularly preferably using different mesh openings and decreasing mesh openings, are likewise preferably carried out before separation of the haematite pigment from the haematite pigment suspension. This has the advantage that foreign bodies, for example pieces of metal, which would otherwise contaminate the haematite pigment are thereby separated off from the haematite pigment suspension.

The separation of the haematite pigment from the haematite pigment suspension can be carried out using all methods known to those skilled in the art, e.g. sedimentation with subsequent removal of the aqueous phase or filtration by means of filter presses, for example by means of membrane filter presses.

In a preferred embodiment of the process of the invention, at least one sulfate salt, for example iron(II) sulfate and/or an alkali metal or alkaline earth metal sulfate, preferably iron(II) sulfate and/or sodium sulfate, can be added to the haematite pigment suspension during or before sieving and/or during or before the separation. This has the advantage that the sedimentation of the haematite pigment from the haematite pigment suspension is accelerated. This makes the subsequent isolation of the haematite pigment easier.

At least one wash of the sediment or filter cake separated off in this way is then optionally carried out. Drying of the haematite pigment separated off in this way, for example by means of filter dryers, belt dryers, kneading dryers, spin flash dryers, drying ovens or spray dryers, is optionally carried out after the separation and/or washing. Drying is preferably carried out by means of belt dryers, plate dryers, kneading dryers and/or spray dryers.

It has surprisingly been found that significantly more haematite pigment is produced per amount of $Fe(NO_3)_2$ used in the process of the invention compared to the process of the prior art in which the buildup of pigment takes place at small amounts of introduced gas without mechanical and/or hydraulic mixing. Compared to the process of the prior art, a larger proportion of the $Fe^{3+}$ present in the haematite pigment originates from the iron and a smaller proportion of the $Fe^{3+}$ present in the haematite pigment originates from the $Fe(NO_3)_2$ in the process of the invention. In the process of the prior art in which the gas introduction amounts used are 6 $m^3$ of gas volume/$m^3$ of batch volume/hour of reaction time or less but no mechanical and/or hydraulic mixing occurs, 1.0 kg of $Fe_2O_3$ per kg of $Fe(NO_3)_2$ or less is usually produced. However, in the process of the invention, 1.2 kg of $Fe_2O_3$ per kg of $Fe(NO_3)_2$ or more, preferably from 1.2 to 2.5 kg of $Fe_2O_3$ per kg of $Fe(NO_3)_2$, are produced. As a result, the process is more economical since less iron(II) nitrate solution, which in contrast to the iron used has to be produced separately, is required for the production process. In addition, a significantly smaller amount of nitrogen oxides is discharged into the gas phase in the process of the invention due to the smaller gas introduction volumes compared to the prior art. In the process according to the prior art, in which a large amount of introduced gas of greater than 6 $m^3$ of gas volume/$m^3$ of batch volume/hour of reaction time of oxygen-containing gas is used but no mechanical and/or hydraulic mixing occurs, 80 g of nitrous gases such as NO and $NO_2$ (always calculated as $NO_2$) or more per kilogram of pigment produced and 40 g of dinitrogen monoxide or more per kilogram of pigment produced are typically given off from the reaction mixture into the ambient air. In addition, the nitrogen oxides dissolved in the liquid phase themselves serve as oxidant like the at least one oxygen-containing gas which oxidizes iron to $Fe^{3+}$. Here, the nitrogen oxides in which the nitrogen has the oxidation numbers +1 to +5 are reduced either to nitrogen, i.e. to $N_2$, which has the oxidation number 0 or to ammonium compounds in which the nitrogen has the oxidation number −3. As a result, significantly smaller amounts of nitrogen oxides and/or ammonium compounds, which have to be removed in a complicated fashion by gas scrubs or other gas or wastewater purification methods, arise in the process of the invention. Furthermore, significantly less energy is carried out from the reaction mixture heated to from 70 to 99° C. into the gas phase due to the lower gas introduction volumes compared to the prior art. Since the amount of $Fe_2O_3$ formed per kg of $Fe(NO_3)_2$ is significantly increased for the same amount of introduced gas, the amount of iron nitrate used in the buildup of the pigment can accordingly be reduced to the same degree without decreases in yield of haematite pigment.

The invention additionally provides a process for producing iron oxide red pigments, comprising at least the reaction of iron, haematite nucleus suspension containing haematite nuclei having a particle size of 100 nm or less and a specific BET surface area of from 40 $m^2$/g to 150 $m^2$/g (measured in accordance with DIN 66131) and iron(II) nitrate solution in the presence of at least one oxygen-containing gas at temperatures of from 70 to 99° C., characterized in that the haematite nucleus suspension is added to at least iron and the iron(II) nitrate solution is added, either before the addition, after the addition or simultaneously with the addition of the haematite nucleus suspension, to the mixture of at least haematite nucleus suspension and iron in such a way that the concentration of iron(II) nitrate is from 0.1 to 25 g/l of liquid phase, preferably from 1 to 20 g/l of liquid phase, calculated on the basis of anhydrous $Fe(NO_3)_2$, producing a suspension of the haematite pigment.

In one embodiment, the reaction is carried out until the haematite pigment has the desired colour shade.

In a further embodiment, the process of the invention comprises separation of the haematite pigment from the haematite pigment suspension by customary methods.

In one embodiment of the process of the invention, iron is placed on the support and the haematite nucleus suspension is then added to this iron. In a further embodiment of the process of the invention, a mixture or iron and water is initially charged and the haematite nucleus suspension is then added to the mixture of iron and water. In a further embodiment, the temperature of the resulting mixture can be from 10 to 99° C.

In further embodiments of the process of the invention, iron(II) nitrate solution is, after the addition or simultaneously with the addition of the haematite nucleus suspension, added to the mixture of at least iron and haematite nucleus suspension in such a way that the concentration of iron(II) nitrate is from 0.1 to 25 g/l of liquid phase, preferably from 1 to 20 g/l of liquid phase, calculated on the basis of anhydrous $Fe(NO_3)_2$. In further embodiments of the process of the invention, iron(II) nitrate solution is, before addition of the haematite nucleus suspension, added to at least iron in such a way that the concentration of iron(II) nitrate is from 0.1 to 25 g/l of liquid phase, preferably from 1 to 20 g/l of liquid phase, calculated on the basis of anhydrous $Fe(NO_3)_2$. In a preferred embodiment, the temperature of the reaction mixture during the addition of the iron(II) nitrate solution is from 70 to 99° C. The content of iron(II) nitrate is typically determined indirectly via measurement of the iron(II) content by potentiometric titration of a sample of the liquid phase which has been acidified with hydrochloric acid using cerium(III) sulfate. The maximum concentration of iron(II) nitrate based on the liquid phase is determined by the rate of addition of the iron(II) nitrate solution to the mixture of at least iron and haematite nucleus suspension. During the process of the invention, iron(II) nitrate is consumed by the reaction with the iron. In a preferred embodiment, the process of the invention is carried out in such a way that the concentration of iron(II) nitrate of from 0.1 to 25 g/l of liquid phase, preferably from 1 to 20 g/l of liquid phase, calculated on the basis of anhydrous $Fe(NO_3)_2$, is maintained over from 70 to 100%, more preferably from 80 to 100%, of the total reaction time. In a further preferred embodiment, the process of the invention is carried out in such a way that the concentration of iron(II) nitrate of from 0.1 to 25 g/l of liquid phase, preferably from 1 to 20 g/l of liquid phase, calculated on the basis of anhydrous $Fe(NO_3)_2$, is maintained over from 70 to 100%, more preferably from 80 to 100%, of the range of the reaction time from 0 to 50 hours. According to the invention, the beginning of the reaction time is defined as the beginning of the addition of the iron(II) nitrate solution and the end of the reaction time is defined as the end of the introduction of the at least one oxygen-containing gas. The beginning of the addition of the iron(II) nitrate solution is, according to the invention, defined as the point in time at which 1% by weight of the total amount of iron(II) nitrate has been added to the mixture of at least iron and haematite nucleus suspension. The end of the introduction of the at least one oxygen-containing gas is, according to the invention, defined as the point in time at which the rate of introduction of the at least one oxygen-containing gas is less than 0.1 m³ of gas volume/m³ of batch volume/hour.

It has surprisingly been found that significantly more haematite pigment is produced per amount of $Fe(NO_3)_2$ used in the process of the invention compared to the processes of the prior art in which the iron(II) nitrate solution is added all at once at the beginning of the buildup of the pigment. Compared to the processes of the prior art, a greater proportion of the $Fe^{3+}$ present in the haematite pigment comes from the iron and a smaller proportion of the $Fe^{3+}$ present in the haematite pigment comes from the $Fe(NO_3)_2$ in the process of the invention. In the process according to the prior art, in which the iron(II) nitrate solution is added all at once to the mixture of haematite nucleus suspension, iron and water and the amount of gas introduced is, for example, 10 m³ of air/m³ of batch volume/hour, 1.7 kg of $Fe_2O_3$ or less are usually produced per kg of $Fe(NO_3)_2$. However, if the amount of gas introduced is, for example, reduced to 2 m³ of air/m³ of batch volume/hour, only 0.6 kg of $Fe_2O_3$ or less is formed per kg of $Fe(NO_3)_2$. However, if the pigment buildup is, according to the invention, carried out with mechanical and/or hydraulic mixing and with an amount of gas introduced of likewise 2 m³ of air/m³ of batch volume/hour and if the iron(II) nitrate solution is added all at once at the beginning of the buildup of the pigment, 1.2 kg of $Fe_2O_3$ or more are produced per kg of $Fe(NO_3)_2$, preferably from 1.2 to 2.2 kg of $Fe_2O_3$ per kg of $Fe(NO_3)_2$.

In a further embodiment, the process for producing iron oxide red pigments comprises the reaction of iron, haematite nucleus suspension containing haematite nuclei having a particle size of 100 nm or less and a specific BET surface area of from 40 m²/g to 150 m²/g (measured in accordance with DIN 66131) and iron(II) nitrate solution in the presence of at least one oxygen-containing gas at temperatures of from 70 to 99° C., characterized in that the reaction
- is carried out with mixing of the liquid phase by means of mechanical and/or hydraulic mixing and
- the introduction of at least one oxygen-containing gas is carried out with a gas introduction volume of 6 m³ of gas volume/m³ of batch volume/hour or less, preferably from 0.2 to 6 m³ of gas volume/m³ of batch volume/hour, particularly preferably from 0.2 to 5 m³ of gas volume/m³ of batch volume/hour, very particularly preferably from 0.2 to 3 m³ of gas volume/m³ of batch volume/hour, and
- the haematite nucleus suspension is added to at least iron and
- the iron(II) nitrate solution is, before the addition, after the addition or simultaneously with the addition of the haematite nucleus suspension, added to the mixture of at least haematite nucleus suspension and iron in such a way that the concentration of iron(II) nitrate is from 0.1 to 25 g/l of liquid phase, preferably from 1 to 20 g/l of liquid phase, calculated on the basis of anhydrous $Fe(NO_3)_2$, producing a suspension of the haematite pigment.

In this embodiment of the process of the invention, 1.5 kg of $Fe_2O_3$ per kg of $Fe(NO_3)_2$ or more, preferably from 1.8 to 3 kg of $Fe_2O_3$ per kg of $Fe(NO_3)_2$, are surprisingly produced. Furthermore, in this embodiment, 20 g of nitrous gases such as NO and $NO_2$ (always calculated as $NO_2$) or less per kilogram of haematite pigment produced and 20 g of dinitrogen monoxide or less per kilogram of haematite pigment produced are typically given off from the reaction mixture into the ambient air.

EXAMPLES AND METHODS

Titration of Iron(II) and Iron(III) Determination:

The content of iron(II) nitrate can be determined indirectly by measuring the iron(II) content by a potentiometric titration of a sample solution acidified with hydrochloric acid using cerium(II) sulfate.

$NO_x$ Measurement $NO_x$ measurements were carried out using a gas analyzer PG 250 from Horriba (chemiluminescence method). Information about $NO_x$ formation were reported as a ratio to the pigment yield (calculated as $NO_2$, in g of $NO_2$/kg of pigment). The $NO_x$ emission arising in the production of the starting materials haematite nucleus and iron nitrate are not included.

$N_2O$ Measurement

Laughing gas measurements were carried out by means of a quantitative gas-chromatographic determination and/or by infrared measurement. Information on $N_2O$ formation was reported as a ratio to the pigment yield (g of $N_2O$/kg of pigment). The $N_2O$ emission arising in the production of the starting materials haematite nucleus and iron nitrate are not included.

Examples 1-8

Examples 1 to 8 were carried out in the same reactor on a comparable scale (amounts of iron used from 55 to 60 kg), with the identical conditions and the identical relevant ratios between the amounts of starting materials and the volumes of the solutions being set. The iron used is generally present in excess. Parameters varied were: amount of gas introduced per unit volume; stirring: yes or no, stirrer speed, pump circulation: yes or no, amount circulated by pumping, flow velocity. These parameters are given for each example in Table 1.

A detailed description of the experiment is given below for Example 7.

55 kg of iron sheet having a thickness of about 1 mm were placed in a 1 m³ reactor equipped with sieve trays (measure opening about 10 mm), sparging ring (at the bottom of the reactor), circulation by pumping and inclined-blade stirrer. The sparging ring and the stirrer are installed underneath the sieve tray, the outlet of the pump circulation is located at the side of the iron bed and the intake of the pump circulation is located at the bottom of the reactor. The iron sheet was distributed uniformly on the sieve tray with a bulk density of 0.6-0.8 kg/l. Water, iron(II) nitrate solution (corresponding to 25.2 kg of $Fe(NO_3)_2$ calculated as anhydrous $Fe(NO_3)_2$, $Fe(NO_3)_2$ concentration=120 g/l) and haematite nucleus suspension (corresponding to 16.1 kg of $Fe_2O_3$, concentration=130 g/l) were subsequently added in such amounts that a batch volume of 700 liters is attained and the concentration of nucleus (calculated as anhydrous $Fe_2O_3$) is 23 g/l and the concentration of iron nitrate (calculated as anhydrous $Fe(NO_3)_2$) is 36 g/l. The mixture was heated to 85° C. with the stirrer switched on (140 rpm, 3.7 m/s, inclined-blade stirrer, 50 cm diameter) and pump circulation switched on and after reaching the temperature sparged with 2 m³ of air/batch volume/hour for 70 hours until an iron(II) nitrate concentration below 0.1 g/l of reaction mixture was reached. Stirring and pumped circulation were continued during the entire reaction time. After the introduction of gas had been ended, an iron(II) nitrate concentration of <0.1 g/l of liquid phase was measured. The reaction mixture was then filtered through a filter press and the haematite pigment obtained was washed with water. The haematite pigment was subsequently dried at 80° C. to a residual moisture content of less than 5% by weight. The dried filter cake was subsequently broken up mechanically by means of a shredder. The haematite pigment was in this way obtained in powder form in a yield of 67.0 kg. The amount of $Fe_2O_3$ nuclei used is 16.1 kg, and the amount of freshly formed $Fe_2O_3$ (67.0 kg-16.1 kg) is 50.9 kg. The amount of iron(II) nitrate reacted is 25.2 kg. This gives a calculated ratio of 50.9 kg/25.2 kg=2.0 kg of $Fe_2O_3$ per kg of $Fe(NO_3)_2$.

Table 1 shows the process parameters which were varied for Examples 1-3 (comparative examples) and Examples 4 to 8 (according to the invention) and also the ratio of kg of $Fe_2O_3$ per kg of $Fe(NO_3)_2$. The results for the amounts of offgases $NO_x$ and $N_2O$ formed are shown in Table 2.

TABLE 1

| Example | Stirring | Pump circulation | Amount of gas introduced per unit volume $[m^3/m^3/h]$ | kg of $Fe_2O_3$ formed/kg of Fe $(NO_3)_2$ consumed |
|---|---|---|---|---|
| 1 (for comparison) | No | No | 1 | 0.3 |
| 2 (for comparison) | No | No | 2 | 0.6 |
| 3 (for comparison) | No | No | 10 | 1.7 |
| 4 | 50 rpm (1.3 m/s circumferential velocity) (Power input 0.19 kW/m³) | No | 2 | 1.3 |
| 5 | 80 rpm (2.1 m/s circumferential velocity, power input 0.3 kW/m³) | No | 2 | 1.5 |
| 6 | 140 rpm (3.7 m/s circumferential velocity, power input 0.71 kW/m³) | No | 2 | 1.8 |
| 7 | 140 rpm (3.7 m/s circumferential velocity, power input 0.71 kW/m³) | 12 m³/h | 2 | 2.0 |
| 8 | No | 12 m³/h | 2 | 1.4 |

TABLE 2

| Example | Amount of $NO/NO_2$ [calculated as $NO_2$ in g/kg of haematite pigment] | Amount of $N_2O$ [in g/kg of haematite pigment] |
|---|---|---|
| 3 (for comparison) | 114 | 57 |
| 7 | 9 | 14 |

Examples 9-12

Examples 9 to 12 were carried out in the same reactor on a comparable scale (amounts of iron used from 55 to 60 kg), with the identical conditions and the identical relative ratios between the amounts of starting materials and the volumes of the solutions being set. The iron used is generally present in excess. Parameters varied were: amount of gas introduced per unit volume; stirring: yes or no, pumped circulation: yes or no, introduction of iron(II) nitrate solution: yes or no. These parameters are given for each example in Table 1.

A detailed description of the experiment is given below for Example 11.

55 kg of iron sheet having a thickness of about 1 mm were placed in 1 m³ reactor equipped with sieve tray (mesh opening about 10 mm), sparging ring (at the bottom of the reactor), pump circulation and inclined-blade stirrer. The sparging ring and the stirrer are installed underneath the sieve tray, the outlet of the pump circulation is located at the side of the iron bed and the intake of the pump circulation is located at the bottom of the reactor. The iron sheet was uniformly distributed on the sieve tray. Water and haematite nucleus suspension (corresponding to 16.1 kg of $Fe_2O_3$ calculated as anhydrous $Fe_2O_3$) is subsequently added in such amounts that a volume of 490 liters is attained. The mixture was heated to 85° C. with the stirrer switched on (140 rpm, 3.7 m/s, inclined-blade stirrer, 50 cm diameter) and pump circulation switched on (12 m³/m³ of batch volume/hour) and after reaching this temperature sparged with 2 m³ of air/m³ of batch volume/hour. After the temperature of 85° C. had been reached, an iron(II) nitrate solution (210 liters, concentration=120 g/l, calculated on the basis of anhydrous $Fe(NO_3)_2$) was introduced over a period of 24 hours in such a way that the $Fe(NO_3)_2$ concentration does not exceed 20 g/l of liquid phase through to the end of the $Fe(NO_3)_2$ addition. The volume of the iron(II) nitrate solution after introduction had been ended was 700 liters. During the addition of the iron(II) nitrate solution and for a further 46 hours afterwards, sparging was continued so that gas was introduced for a total of 70 hours. Stirring and pump circulation were continued during the entire reaction time. After introduction of gas for 70 hours, an iron(II) nitrate concentration of <0.1 g/l of reaction mixture was attained. The reaction mixture was then filtered through a filter press and the haematite pigment obtained was washed with water. The haematite pigment was subsequently dried at 80° C. to a residual moisture content of less than 5% by weight. The dried filter cake was subsequently broken up mechanically by means of a shredder. The haematite pigment was in this way obtained in powder form in a yield of 78.9 kg.

The amount of $Fe_2O_3$ nuclei used was 16.1 kg, and the amount of freshly formed $Fe_2O_3$ (76 kg-16.1 kg) is 59.9 kg. The amount of iron(II) nitrate reacted was 25.2 kg. This gives a calculated ratio of 59.9 kg/25.2 kg=2.4 kg of $Fe_2O_3$ per kg of $Fe(NO_3)_2$.

Table 3 shows the ratios of kg of $Fe_2O_3$ per kg of $Fe(NO_3)_2$ for Example 7 and also the results for the amounts of offgases $NO_2$ and $N_2O$ formed.

TABLE 3

| Example | Introduction of iron (II) nitrate | kg of $Fe_2O_3$ formed/kg of Fe $(NO_3)_2$ consumed |
|---|---|---|
| 7 | Total amount was added all at once, initial concentration: 36 g/l | 2.0 |
| 11 | Introduction so that the iron (II) nitrate concentration is below 20 g/l | 2.4 |

TABLE 4

| Example | Mixing | Amount of gas introduced per unit volume m³/m³/h | Fe(NO₃)₂ addition | NO/NO₂ calculated as NO₂ in g/kg of pigment | N₂O in g/kg of pigment |
| --- | --- | --- | --- | --- | --- |
| 3 | None | 10 (air) | All into the initial charge | 114 | 57 |
| 9 | None | 10 (air) | Below 20 g/l by slow addition | 73 | 46 |
| 7 | Stirrer: 140 rpm (3.7 m/s) Pump circulation: 12 m³/h | 2 (air) | All into the initial charge | 9 | 14 |
| 11 | Stirrer: 140 rpm (3.7 m/s) Pump circulation: 12 m³/h | 2 (air) | Below 20 g/l by slow addition | 5 | 10 |
| 12 | Pump circulation: 12 m³/h | 6 (air) | All into the initial charge | 78 | 44 |

An amount circulated by pumping of 12 m³/hour corresponds in the test reactor to an an amount circulated by pumping of 17 batch volumes/hour and a flow velocity at the outlet of 1.4 m/s. An amount circulated by pumping of 6 m³/hour corresponds in the test reactor to an amount circulated by pumping of 8.5 batch volumes/h and a flow velocity at the outlet of 0.7 m/s.

What is claimed is:

1. A process for producing haematite pigments, the process comprising: contacting iron, an aqueous haematite nucleus suspension containing haematite nuclei which have a particle size of 100 nm or less and a specific BET surface area of 40 m²/g to 150 m²/g (measured in accordance with DIN 66131), and an iron(II) nitrate solution, in the presence of at least one oxygen-containing gas at temperatures of 70 to 99° C. to produce a suspension comprising haematite pigment,
   wherein the aqueous solution of the iron, the haematite nucleus suspension, and the iron(II) nitrate solution is mixed by means of hydraulic mixing;
   wherein the hydraulic mixing is carried out by means of at least one pump which takes a liquid phase from a reactor at an outlet and feeds it back into the reactor at another place by an inlet, and
   wherein the at least one oxygen-containing gas is introduced into the aqueous solution with a gas introduction volume of 6 m³ of gas volume/m³ of batch volume/hour or less.

2. The process according to claim 1, wherein the reaction is carried out until the haematite pigment has a desired colour shade.

3. The process according to claim 1 further comprising separating haematite pigment from the reaction mixture by conventional methods.

4. The process according to claim 1, wherein the haematite pigment has the α-Fe₂O₃ modification.

5. The process according to claim 1, wherein the hydraulic mixing is carried out at a pumped circulation volume of from 0.1 to 20 batch volumes/hour.

6. The process according to claim 1, wherein the hydraulic mixing is carried out in a reactor having at least one inlet and at least one outlet for the reaction mixture in such a way that the flow velocity at the inlet of the reactor is at least 0.05 m/s.

7. The process according to claim 1, further comprising mixing the iron(II) nitrate solution with the iron before mixing of the haematite nucleus suspension with the iron in such a way that the concentration of iron(II) nitrate is from 0.1 to 25 g/l of liquid phase, calculated on the basis of anhydrous Fe(NO₃)₂.

8. The process according to claim 1, further comprising mixing the iron(II) nitrate solution with the iron simultaneously with mixing of the haematite nucleus suspension with the iron in such a way that the concentration of iron(II) nitrate is from 0.1 to 25 g/l of liquid phase, calculated on the basis of anhydrous Fe(NO₃)₂.

9. The process according to claim 1, further comprising mixing the iron(II) nitrate solution with the iron after mixing of the haematite nucleus suspension with the iron in such a way that the concentration of iron(II) nitrate is from 0.1 to 25 g/l of liquid phase, calculated on the basis of anhydrous Fe(NO₃)₂.

10. The process according to claim 1, further comprising introducing the at least one oxygen-containing gas into the aqueous solution with a gas introduction volume of 0.2 to 3 m³ of gas volume/m³ of batch volume/hour.

11. The process according to claim 1, wherein the hydraulic mixing is carried out in a reactor having at least one inlet and at least one outlet for the reaction mixture in such a way that the flow velocity at the inlet of the reactor is at least 0.06 m/s.

12. The process according to claim 1, further comprising mixing the iron(II) nitrate solution with the iron before mixing of the haematite nucleus suspension with the iron in such a way that the concentration of iron(II) nitrate is from 1 to 20 g/l of liquid phase, calculated on the basis of anhydrous Fe(NO₃)₂.

13. The process according to claim 1, further comprising mixing the iron(II) nitrate solution with the iron simultaneously with mixing of the haematite nucleus suspension with the iron in such a way that the concentration of iron(II) nitrate is from 1 to 20 g/l of liquid phase, calculated on the basis of anhydrous Fe(NO₃)₂.

14. The process according to claim 1, further comprising mixing the iron(II) nitrate solution with the iron after mixing of the haematite nucleus suspension with the iron in such a way that the concentration of iron(II) nitrate is from 1 to 20 g/l of liquid phase, calculated on the basis of anhydrous Fe(NO₃)₂.

* * * * *